US011553411B2

(12) United States Patent
Chen et al.

(10) Patent No.: US 11,553,411 B2
(45) Date of Patent: Jan. 10, 2023

(54) END-TO-END NETWORK SLICE SELECTION AND CONFIGURATION

(71) Applicant: Orange, Paris (FR)

(72) Inventors: Xiaobao Chen, Bristol (GB); Serge Raes, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/967,389

(22) PCT Filed: Jan. 30, 2019

(86) PCT No.: PCT/EP2019/052283
§ 371 (c)(1),
(2) Date: Aug. 4, 2020

(87) PCT Pub. No.: WO2019/149772
PCT Pub. Date: Aug. 8, 2019

(65) Prior Publication Data
US 2021/0219218 A1 Jul. 15, 2021

(30) Foreign Application Priority Data
Feb. 5, 2018 (EP) .................................... 18305116

(51) Int. Cl.
*H04W 48/18* (2009.01)
*H04W 24/02* (2009.01)
(Continued)

(52) U.S. Cl.
CPC ........... *H04W 48/18* (2013.01); *H04W 24/02* (2013.01); *H04W 48/16* (2013.01); *H04W 60/00* (2013.01); *H04W 88/06* (2013.01)

(58) Field of Classification Search
CPC ..... H04W 48/16; H04W 48/18; H04W 60/00; H04W 24/02; H04W 88/06
See application file for complete search history.

(56) References Cited

U.S. PATENT DOCUMENTS

2017/0303259 A1 10/2017 Lee et al.
2017/0332212 A1* 11/2017 Gage ....................... H04W 4/08
(Continued)

FOREIGN PATENT DOCUMENTS

WO  WO 2017/140644 A1  8/2017

OTHER PUBLICATIONS

International Search Report and Written Opinion dated Mar. 14, 2019 for Application No. PCT/EP2019/052283.
(Continued)

*Primary Examiner* — Wayne H Cai
(74) *Attorney, Agent, or Firm* — Knobbe, Martens, Olson & Bear, LLP

(57) ABSTRACT

A system and associated method for enabling end-to-end (E2E) network slicing in a 5G network are described. A (Radio) Access Network-Network Slice Selection Function ((R)AN-NSSF) can be configured to receive a (R)AN slice selection request and to select, from a pool of (R)AN slice instances, a (R)AN network slice instance including one or more (R)AN slice components. A Core Network-Network Slice Selection Function (CN-NSSF) can be configured to receive a CN slice selection request to select, from a pool of CN slice instances, a CN network slice instance including one or more CN slice components. A Network Slice Policy Control (NSPC) function can be configured to verify that the selected (R)AN slice instance and CN slice instance are consistent with operator policies.

16 Claims, 7 Drawing Sheets

(51) Int. Cl.
*H04W 48/16* (2009.01)
*H04W 60/00* (2009.01)
*H04W 88/06* (2009.01)

(56) References Cited

U.S. PATENT DOCUMENTS

2019/0200285 A1\* 6/2019 Velev .................... H04W 48/18
2020/0275347 A1\* 8/2020 Qiao ..................... H04W 48/18
2020/0359291 A1\* 11/2020 Ramle ................... H04W 48/18

OTHER PUBLICATIONS

"3rd Generation Partnership Project; Technical Specification Group Services and System Aspects; System Architecture for the 5G System; Stage 2 (Release 15)", vol. SA WG2, No. V15.0.0, Dec. 22, 2017, pp. 1-181, XP051392101.

"3rd Generation Partnership Project; Technical Specification Group Services and System Aspects; Procedures for the 5G System; Stage 2 (Release 15)", vol. SA WG2, No. V2.0.0, Dec. 15, 2017, pp. 1-260, XP051391988.

\* cited by examiner

END-TO-END NETWORK SLICE SELECTION AND CONFIGURATION

RELATED APPLICATIONS

This application is the U.S. National Phase of Application No. PCT/EP2019/052283 entitled "END-TO-END NETWORK SLICE SELECTION AND CONFIGURATION" and filed Jan. 30, 2019, which claims the benefit of European Patent Application No. 18305116.8, filed Feb. 5, 2018, each of which is incorporated by reference in its entirety.

FIELD OF THE INVENTION

The present invention relates to the field of communications and more particularly to network slicing in a 5G communication network.

TECHNICAL BACKGROUND

FIG. 1 illustrates the 5G system (5GS) architecture as described in the 3GPP TS 23.501 v15.0.0 document. As shown in FIG. 1, the 5GS architecture consists of a plurality of network functions (NFs) that are directly or indirectly connected with each other. One design aspect of the 5GS architecture is the separation of User Plane (UP) functions, i.e. the User Plane Function (UPF), and Control Plane (CP) Functions (Network Slice Selection Function (NSSF), Network Exposure Function (NEF), NF Repository Function (NRF), Policy Control Function (PCF), Unified Data Management (UDM), Application Function (AF), Authentication Server Function (AUSF), Access and Mobility Management Function (AMF), and Session Management Function (SMF)). The separation of the UP functions and the CP functions is intended to allow independent scalability, evolution, and flexible deployments.

Another design aspect of the 5GS architecture is the modularization of NFs to enable flexible and efficient "network slicing." Network slicing is a 5G concept geared towards making the 5GS an end-to-end (E2E), scalable, and adaptable system that supports various types of communication services, different traffic demands, and different end user types. For example, some of the communication services envisioned to be supported in 5G include enhanced mobile broadband (eMBB), massive machine-type communication (mMTC), and ultra-reliable low latency communication (URLLC).

FIG. 2 illustrates the 5G concept of network slicing as described in the 3GPP TS 28.530 v0.4.0 document. As shown in FIG. 2, network slicing is based on sharing a common physical infrastructure to create and run multiple logically independent networks each designed to support a respective communication service instance. Specifically, the necessary Core Network (CN) and Access Network (AN) functions are grouped together to pre-configure network slices with varying features. The network slices are deployed to end users as network slice instances (NSIs). For example, FIG. 2 shows three different network slice instances, NSI A, NSI B, and NSI C deployed to serve respectively a first communication service instance (Communication Service Instance 1), a second communication service instance (Communication Service Instance 2), and a third communication service instance (Communication Service Instance 3). NSI A is a network slice instance of a network slice that provides a CN function (CN-1) and an AN function (AN-1). As such, NSI A includes a Network Slice Subnet Instance (NSSI) of CN-1 (i.e., a CN-1 instance) and a NSSI of AN-1 (i.e., an AN-1 instance). Similarly, NSI B is a network slice instance of a network slice that provides a CN-2 function and an AN-2 function. NSI C is a network slice instance of a network slice that provides a CN-3 function and the same AN-2 function provided by NSI B.

The 3GPP TS 23.501 v15.0.0 document requires that a network slice be defined within a PLMN (Public Land Mobile Network) and to include: the CN CP and UP network functions (described in clause 4.2) and, in the serving PLMN, at least one of the Next Generation (NG) RAN described in 3GPP TS 38.300 or the N3IWF functions to the non-3GPP Access Network described in clause 4.2.8.

A network slice instance is identified by an S-NSSAI (Single-Network Slice Selection Assistance Information), which includes a Slice/Service Type (SST) and Slice Differentiator (SD). The SST specifies the expected network slice behavior in terms of features and services. The SD, which is optional, complements the SST to differentiate amongst multiple network slice instances having the same SST. For example, an operator can deploy multiple network slice instances delivering the same features but for different groups of UEs. Such network slice instances would have the same SST but different SDs, thus different S-NSSAIs.

A UE may be served by a 5G network using one or more network slice instances simultaneously and may be associated with a total of eight different S-NSSAIs at a given time. A collection of S-NSSAIs is referred to as an NSSAI. An NSSAI may be an Allowed NSSAI, a Configured NSSAI, or a Requested NSSAI. An Allowed NSSAI is an NSSAI provided by the serving PLMN to the UE during a registration procedure, for example, and indicates the S-NSSAIs to be used by the UE in the serving PLMN. A Configured NSSAI represents an NSSAI provisioned in the UE per PLMN. A Requested NSSAI is an NSSAI provided by the UE to the serving PLMN during registration and contains the S-NSSAI(s) of the network slice instance(s) to which the UE wishes to register.

FIG. 3 illustrates the registration procedure for a UE to register with a 5GS. A detailed description of this procedure can be found in 3GPP TS 23.502 v15.0.0 (section 4.2.2.2.) and will not be repeated herein. It is envisioned that this procedure be used by a UE to register with network slice instances. Specifically, when the UE registers with a PLMN, if the UE has for the PLMN a Configured NSSAI or an Allowed NSSAI, then the UE provides a Requested NSSAI to the network. The Requested NSSAI corresponds to the Configured NSSAI or a subset thereof when the UE has no Allowed NSSAI for the PLMN. Otherwise, if the UE has an Allowed NSSAI for the PLMN, the Requested NSSAI is the Allowed NSSAI or a subset thereof and, if the UE additionally has a Configured NSSAI for the PLMN, the Requested NSSAI further includes one or more S-NSSAI(s) from the Configured NSSAI that are not already present in the Allowed NSSAI and that have not been previously rejected by the network.

The Requested NSSAI provided by the UE allows the network to select a serving AMF for the UE. The serving AMF verifies the Requested NSSAI against UE Subscription Information (containing one or more Subscribed S-NSSAIs) and interacts with the NSSF to select the set of network slice instance(s) to serve the UE.

However, despite providing the above requirements for a network slice instance, the existing 5G standards do not define what a network slice instance is composed of and how it is actually constructed, nor include a procedure for associating a network slice instance with constituting components such as network functions (e.g., CP and UP functions) and resources.

The present invention has been made in the light of these gaps in the existing 5G standards.

SUMMARY OF THE INVENTION

The present invention provides a method, performed by a network, for network slice selection and configuration. The method may be initiated by a User Equipment (UE) with a pre-configured UE network slice instance requesting a network slice instance from the network to support a communication service. In an embodiment, the method comprises:

receiving, by a first Access and Mobility Management Function (AMF) from a (Radio) Access Network ((R) AN), an AMF selection request including Requested Network Slice Selection Assistance Information (NSSAI) and a User Equipment (UE) Network Slice Component Identifier (UE-NSCID);

sending, from the first AMF to a (R)AN-Network Slice Selection Function ((R)AN-NSSF), a (R)AN slice selection request including the Requested NSSAI and the UE-NSCID;

receiving, by the first AMF from the (R)AN-NSSF, a (R)AN slice selection response including an Allowed Single-NSSAI (S-NSSAI) and selected (R)AN slice information including a selected (R)AN network slice instance (NSI) associated with the Allowed S-NSSAI and a selected (R)AN slice component associated with the selected (R)AN NSI; and sending, from the first AMF to the (R)AN, a network slice access confirmation including the Allowed S-NSSAI and the selected (R)AN slice information.

The (R)AN slice instance selected according to the method is thus based on the UE network slice instance, which ensures that the provided (R)AN support is appropriately adapted to the requested communication service.

In an embodiment, the method further comprises, at the first AMF, verifying whether an S-NSSAI in the Requested NSSAI is permitted based on Subscription Information; and authorizing or denying the AMF selection request based on the verification.

The (R)AN slice selection request may or may not include pre-configured (R)AN slice information identifying the (R)AN slice instance being requested. As such, in an embodiment, the method further comprises determining whether pre-configured (R)AN slice information, including at least one of a (R)AN network slice type (AN-NST), a (R)AN slice instance ID (AN-SID), a (R)AN slice component type (AN-SCT), a (R)AN slice component ID (AN-SCID), and a (R)AN slice component Quality of Service (AN-SCQoS), is available for the Requested NSSAI; and including the pre-configured (R)AN slice information in the (R)AN slice selection request when available.

When the pre-configured (R)AN slice information is included in the (R)AN slice selection request, the method further comprises sending, by the (R)AN-NSSF to a Network Slice Policy Control (NSCP) function, a message to verify the pre-configured (R)AN slice information; and determining, by the (R)AN-NSSF, the selected (R)AN slice information based on the verification of the pre-configured (R)AN slice information.

When the pre-configured (R)AN slice information is not included in the (R)AN slice selection request (i.e., the values are left empty), the method further comprises generating, by the (R)AN-NSSF, (R)AN slice information based on the Requested NSSAI and the UE-NSCID; sending, by the (R)AN-NSSF to a Network Slice Policy Control (NSCP) function, a message to verify the generated (R)AN slice information; and determining, by the (R)AN-NSSF, the selected (R)AN slice information based on the verification of the generated (R)AN slice information.

Once the (R)AN slice component has been selected, it can be configured for signaling or data traffic forwarding depending on whether it is a CP or a UP slice component in the (R)AN.

In an embodiment, the (R)AN slice selection response further includes information regarding a target AMF that serves the selected (R)AN NSI associated with the Allowed S-NSSAI. The target AMF initiates a process to select a CN slice instance to form an end-to-end slice with the selected (R)AN NSI and the initiating UE network slice instance. According, the method may further comprise:

sending, from the target AMF to a Core Network-Network Slice Selection Function (CN-NSSF), a CN slice selection request including the Requested NSSAI and the UE-NSCID; and receiving, by the target AMF from the CN-NSSF, a CN slice selection response including information regarding the Allowed S-NSSAI and selected CN slice information including a selected CN NSI associated with the Allowed S-NSSAI and a selected CN slice component associated with the selected CN NSI.

The CN slice selection request may or may not include pre-configured CN slice information identifying the CN slice instance being requested. As such, in an embodiment, the method of claim 8, further comprises determining whether pre-configured CN slice information, including at least one of a CN network slice type (CN-NST), a CN slice instance ID (CN-SID), a CN slice component type (CN-SCT), a CN slice component ID (CN-SCID), and a CN slice component Quality of Service (CN-SCQoS), is available for the Requested NSSAI; and including the pre-configured CN slice information in the CN slice selection request when available.

When the pre-configured CN slice information is included in the CN slice selection request, the method further comprises sending, by the CN-NSSF to the NSCP function, a message to verify the pre-configured CN slice information; and determining the selected CN slice information based on the verification of the pre-configured CN slice information.

When the pre-configured CN slice information is not included in the CN slice selection request (i.e., the values are left empty), the method further comprises generating, by the CN-NSSF, CN slice information based on the Requested NSSAI and the UE-NSCID; sending, by the CN-NSSF to NSCP function, a message to verify the generated CN slice information; and determining, by the CN-NSSF, the selected CN slice information based on the verification of the generated CN slice information.

Once the CN slice component has been selected, it can be configured for signaling or data traffic forwarding depending on whether it is a CP or a UP slice component in the Core Network.

The invention further provides a network function module, comprising
 a sender;
 a receiver; and
 a processor; and
 a memory, coupled to the processor, having instructions stored therein that, when executed by the processor, cause the processor:

receive using the receiver, from a (Radio) Access Network ((R)AN), an AMF selection request including Requested Network Slice Selection Assistance Information (NSSAI) and a User Equipment (UE) Network Slice Component Identifier (UE-NSCID);

send using the sender, to a (R)AN-Network Slice Selection Function ((R)AN-NSSF), a (R)AN slice selection request including the Requested NSSAI and the UE-NSCID;

receive using the receiver, from the (R)AN-NSSF, a (R)AN slice selection response including an Allowed Single-NSSAI (S-NSSAI) and selected (R)AN slice information including a selected (R)AN network slice instance (NSI) associated with the Allowed S-NSSAI and a selected (R)AN slice component associated with the selected (R)AN NSI; and send using the sender, to the (R)AN, a network slice access confirmation including the Allowed S-NSSAI and the selected (R)AN slice information.

The network function module may be implemented within an AMF.

The invention further enables a network that supports various types of communication services using E2E network slicing. In the network, network slice instances are divided into UE network slice instances, (R)AN network slice instances, and CN network slice instances. Each network slice instance (UE, (R)AN, or CN) may include one or more network slice components (i.e., network functions and/or resources). Network slice instances (UE, (R)AN, or CN) may be pre-configured or created dynamically during network operation. A UE wishing to use a communication service initiates a procedure with the network, which results in forming an E2E network slice instance for supporting the service. In an embodiment, the procedure is supported by the network using:

a (Radio) Access Network-Network Slice Selection Function ((R)AN-NSSF) configured to receive a (R)AN slice selection request, including a User Equipment (UE) Network Slice Component Identifier (UE-NSCID) identifying a UE slice component, and to select from a pool of (R)AN slice instances, based on the UE-NSCID, a (R)AN network slice instance including one or more (R)AN slice components; and a Core Network-Network Slice Selection Function (CN-NSSF) configured to receive a CN slice selection request including the UE-NSCID and to select from a pool of CN slice instances, based on the UE-NSCID, a CN network slice instance including one or more CN slice components.

In an embodiment, the (R)AN slice instance and the CN slice instance are configured based on at least one of a service type, a service level agreement (SLA), or a Quality of Service (QoS) associated with a communication service that uses the UE slice component. The UE slice instance composed of one or more than one UE slice components, the (R)AN slice instance composed of one or more (R)AN slice components, and the CN slice instance composed of one or more CN slice components to form an end-to-end (E2E) network slice instance for supporting the communication service.

The network may further comprise a Network Slice Policy Control (NSPC) function, in communication with the (R)AN-NSSF and the CN-NSSF, configured to verify that the selected (R)AN slice instance and CN slice instance comply with operator policies.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

The present invention provides a system and an associated procedure for enabling end-to-end (E2E) network slicing in a 5G system.

Figure 4:
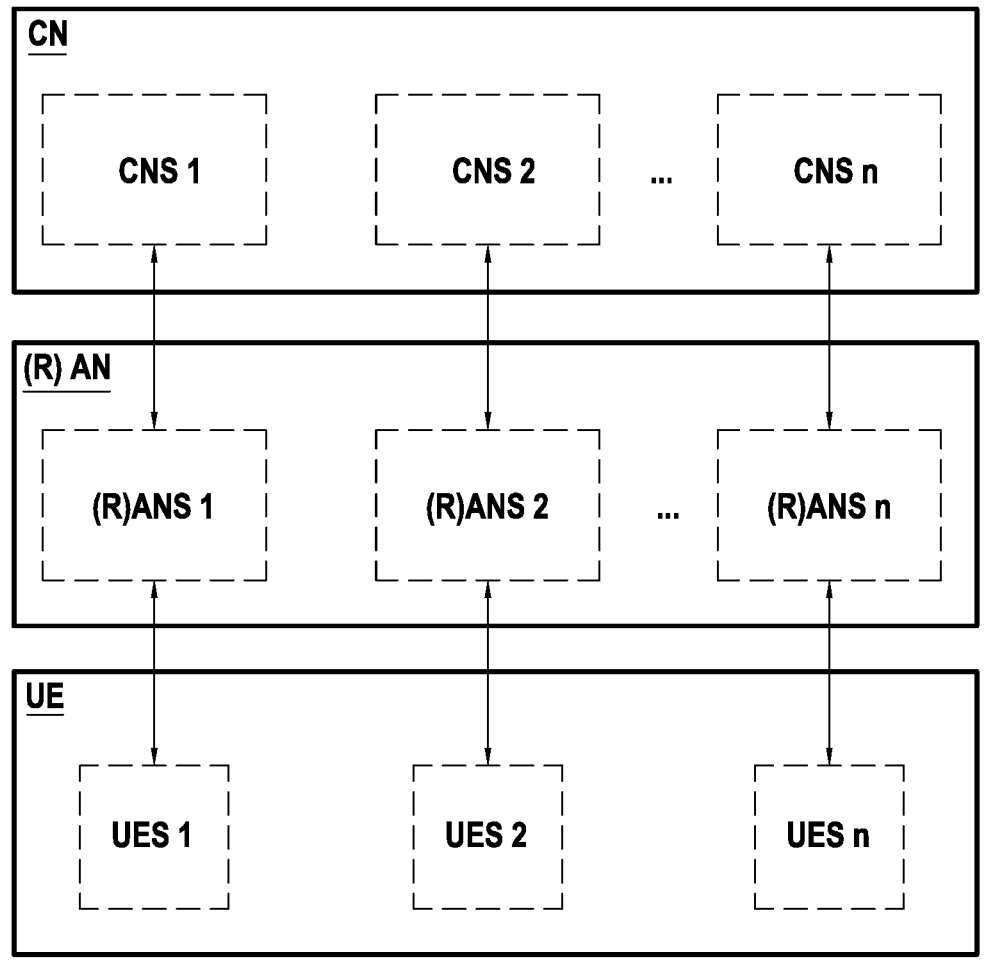
FIG. 4 is a block diagram that illustrates network slicing according to an embodiment of the present invention.

FIG. 4 is a block diagram that illustrates E2E network slicing according to an embodiment of the present invention. As shown in FIG. 4, one aspect of the proposed system is that an E2E network slice instance is formed by joining a UE network slice instance, a (R)AN network slice instance, and a CN network slice instance. The E2E network slice instance is thus a logical network that spans the UE, the (R)AN, and the CN to support a communication service.

As prescribed in the 5G standards, multiple network slice instances can be enabled simultaneously in the proposed system. The multiple network slices instances may support the same or different communication services. For example, referring to FIG. 4, a first network slice instance including a first UE slice instance (UES1), a first (R)AN slice instance ((R)ANS1), and a first CN slice instance (CNS1) may be provided to support an eMBB Service. A second network slice instance including a second UE slice instance (UES2), a second (R)AN slice instance ((R)ANS2), and a second CN slice instance (CNS2) may be provided to support a URLLC service, and a third network slice instance including a third UE slice instance (UES3), a third (R)AN slice instance ((R)ANS3), and a third CN slice instance (CNS3) may be provided to support an mMTC service.

In an embodiment, network slice instances may be pre-configured or generated dynamically during system operation. Pre-configuration however is performed at the UE, (R)AN, and/or CN level. In other words, the present invention may provide pre-configured UE slice instances, (R)AN slice instances, and/or CN slice instances. During operation, E2E network slice instances may be created from the pre-configured UE, (R)AN, and/or CN slice instances. Thus, unlike the existing standards which suggest pre-configuring vertical network slice instances (each consisting of a (R)AN and a CN network function), the present invention performs slicing separately at the UE, (R)AN, and CN level. Selected UE, (R)AN, and CN are then joined to form an E2E network slice for a particular communication service. Higher network slicing flexibility is thereby achieved.

In an embodiment, the system may maintain separate pools of UE, (R)AN, and CN slice instances. A UE may be pre-configured at manufacture or during operation with one or more UE slice instances from the UE slice instances pool. Depending on the communication service desired, the UE may be configured to utilize one or more of the pre-configured UE slice instances. At the network side, the one or more pre-configured UE slice instances are matched with appropriate, one or more (R)AN slice instances and one or more CN slice instances to support the desired communication service.

The proposed system relies on a definition of a network slice instance as described below. This definition addresses the existing gap in the 5G standards regarding the composition of a network slice instance.

According to the proposed system, a UE/(R)AN/CN slice instance may be identified by a Network Slice Identifier (NSID) and a Network Slice Service Type (NSST). In an embodiment, the NSID and the NSST may be represented using an S-NSSAI as defined in the existing standards. The slice instance may also have an associated Network Slice Type (NST), Network Slice Policies (NSP), and a Network Slice QoS (NSQoS). The NST identifies the type of the network slice. For example, a CN slice instance may be of a control plane (CP) or a user plane (UP) type. A (R)AN slice instance type may also specify whether the instance is CP or UP as well as specify the base station type (e.g., gNB, eLTE). The NSP define the operator policies for the slice instance. The NSQoS indicates the QoS contribution of the network slice instance.

Figure 5:
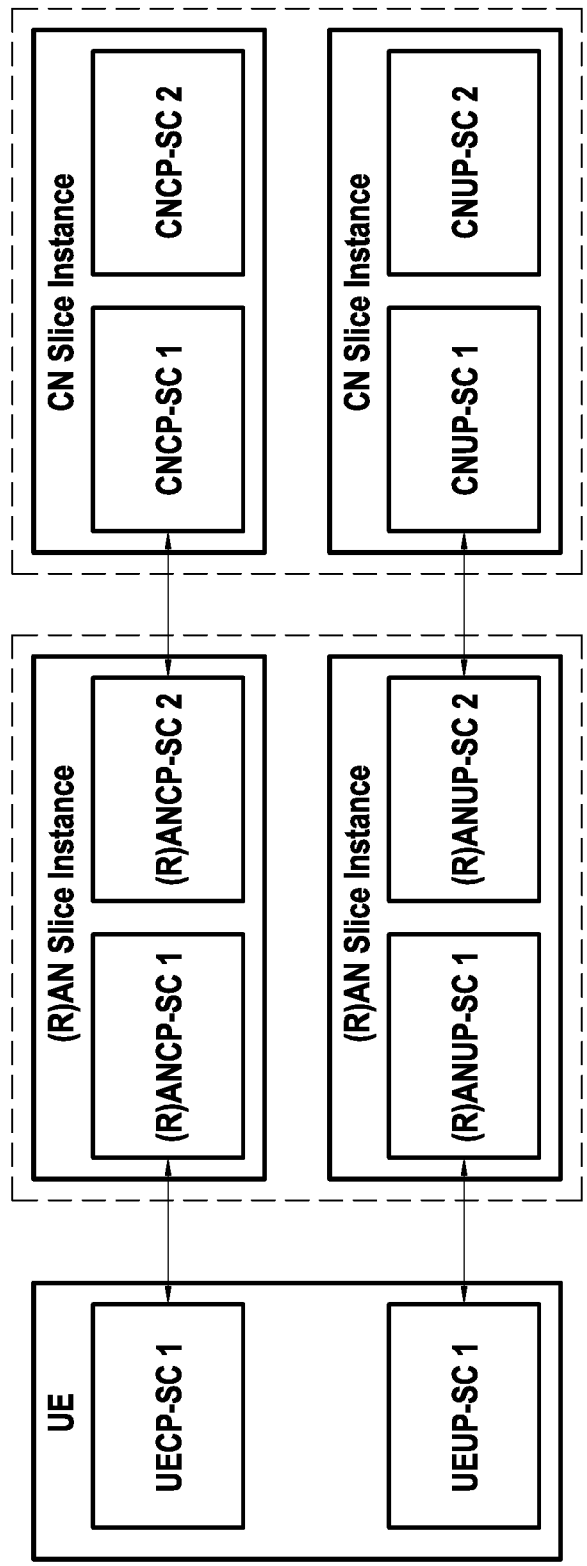
FIG. 5 is a block diagram that illustrates network slice composition according to an embodiment of the present invention.

A UE/(R)AN/CN slice instance may comprise one or more network slice components. This concept is illustrated in FIG. 5, which shows an example composition of E2E network slice instances according to the present invention. As would be understood by a person skilled in the art based on the teachings herein, this example is provided for the purpose of illustration only and is not limiting. Specifically, FIG. 5 shows two E2E network slice instances. The first E2E network slice instance is composed of CP network slice instances, including a UE CP slice instance, a (R)AN CP slice instance, and a CN CP slice instance. The UE CP slice instance includes a single UE CP slice instance component, UECP-SC1. The (R)AN CP slice instance includes two CP slice components (R)ANCP-SC1 and (R)ANCP-SC2, and the CN CP slice instance includes two CP slice components, CNCP-SC1 and CNCP-SC2. The second E2E network slice instance is composed of UP network slice instances, including a UE UP slice instance, a (R)AN UP slice instance, and a CN UP slice instance. The UE UP slice instance includes a single UE UP slice instance component, UEUP-SC1. The (R)AN UP slice instance includes two UP slice components (R)ANUP-SC1 and (R)ANUP-SC2, and the CN UP slice instance includes two UP slice components, CNUP-SC1 and CNUP-SC2. In an embodiment, the first E2E CP network slice instance handles signaling for a communication service, and the second E2E UP network slice instance handles user data forwarding for the communication service.

In an embodiment, a network slice component is identified by a Network Slice Component ID (NSCID), which is an intra/inter-network ID to uniquely identify the network slice component, and is associated with a NSCQoS, which indicates the QoS contribution of the network slice component.

The network slice component is also associated with a Network Slice Component Type (NSCT). The NSCT identifies the network slice component as one of the following: CN CP function, (R)AN CP function, UE CP function, CN UP function, (R)AN UP function, UE UP function, and an inter-network reference point. In an embodiment, a CN CP network slice component may have a NSCT of AUSF, UDM, AMF, SMF, PCT, or AF. A CN UP network slice component may have an NSCT of UPF. In an embodiment, a (R)AN CP network slice component may include the Radio Resource Control (RRC) function, the Packet Data Convergence Protocol (PDCP) function, and the Medium Access Control (MAC) layer and physical (PHY) layer functions, etc. A (R)AN UP network slice component may include the Radio Link Control (RLC) function, the PDCP function, the MAC layer functions, and the PHY layer functions such as antenna, power amplifier, waveforms, numerology, carrier, sub-carrier, sampling rate, symbol duration, frame/sub-frame length, (nxk) MIMO, etc.

Figure 6:
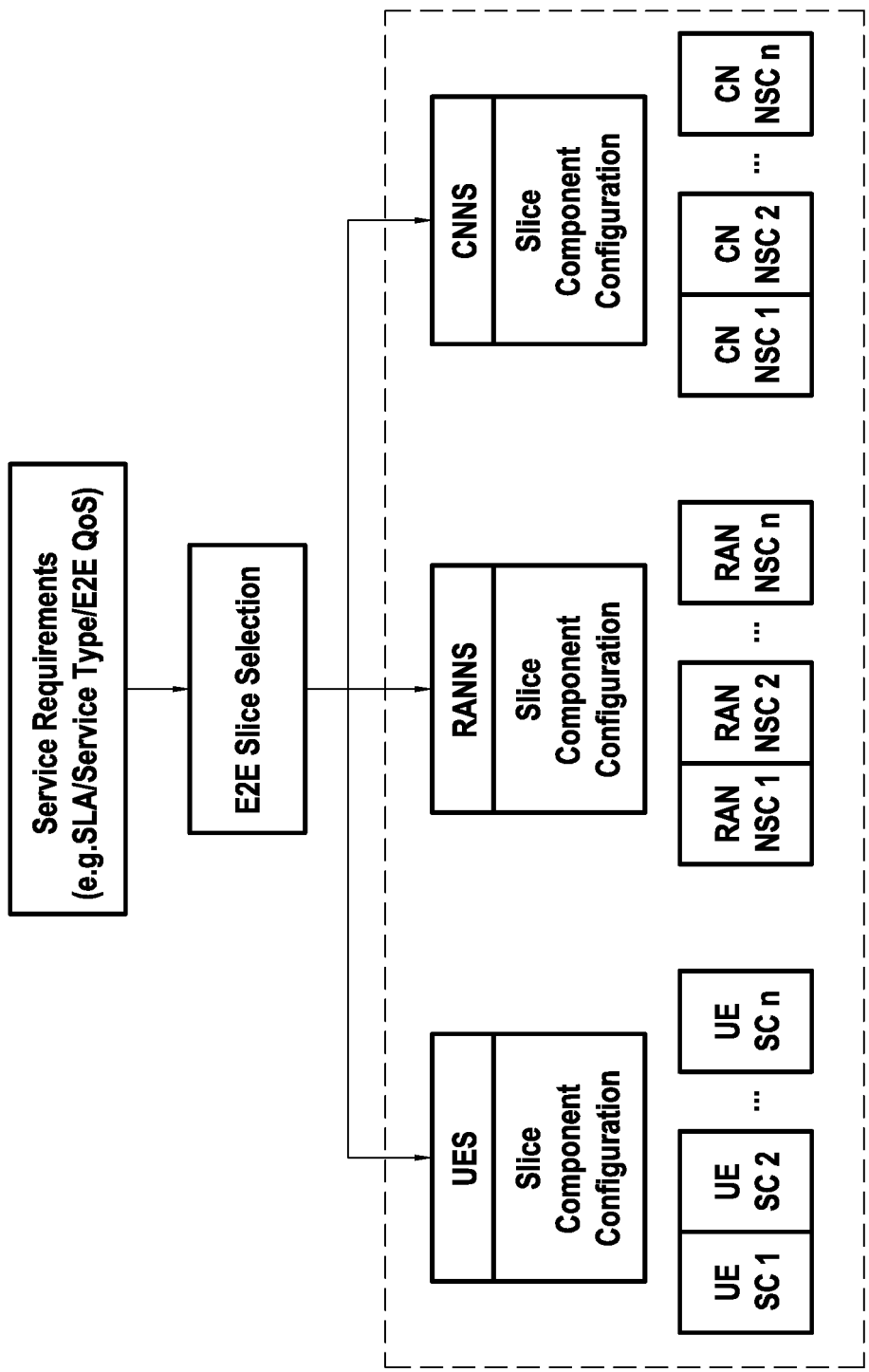
FIG. 6 is a block diagram that illustrates network slice selection and configuration according to an embodiment of the present invention.

Using the above-described structure/definition of network slice instances, the proposed system and associated procedure, further described below, enable E2E network slicing and configuration based on an input-output model as illustrated in FIG. 6. As shown in FIG. 6, the E2E network slicing model provides an E2E slice selection function that receives as input the Service Requirements (e.g., Service Level Agreement (SLA), Service Type, E2E QoS) of a communication service to be supported. The E2E slice selection function provides as an output an allocation of resources, including a UE slice instance with an associated configuration, a (R)AN slice instance with an associated configuration, and a CN slice instance with an associated configuration. Each of the UE/(R)AN/CN slice instances is composed of one or more corresponding network slice components as described above.

In an embodiment, the proposed network slicing is implemented by modifying the existing 5G architecture to enable a network with a network slice selection function including separate (R)AN network slice selection function and CN network slice selection function. In an embodiment, the (R)AN network slice selection function is provided by a (R)AN NSSF and the CN network slice selection function is provided by a CN NSSF. The (R)AN-NSSF and the CN-NSSF may be implemented within the existing NSSF prescribed in the 5G architecture or as separate network functions.

In an embodiment, the (R)AN NSSF is configured to receive a (R)AN slice selection request and to select, from a pool of (R)AN slice instances, a (R)AN network slice instance including one or more (R)AN slice components. In one embodiment, the (R)AN slice selection request is triggered by a UE requesting a communication service and includes one or more UE-NSCIDs identifying one or more UE slice components. The one or more UE slice components may be associated with a UE slice instance that is pre-configured within the UE to be used with the requested communication service. The one or more UE-NSCIDs may be used in the selection of the (R)AN network slice instance.

The CN-NSSF is configured to receive a CN slice selection request and to select, from a pool of CN slice instances, a CN network slice instance including one or more CN slice components. In an embodiment, the CN slice selection request includes the one or more UE-NSCIDs identifying the one or more UE slice components. The one or more UE-NSCIDs may be used in the selection of the CN network slice instance.

In an embodiment, the provided network slice selection also includes the configuration of the selected (R)AN and CN slice instances based on the requested communication service. This may include configuring the selected (R)AN and CN slice instances based on at least one of a service type, a service level agreement (SLA), or a Quality of Service (QoS) associated with the requested communication service.

To ensure that the selected (R)AN and CN slice instances are consistent with operator policies, in an embodiment, a Network Slice Policy Control (NSPC) function, in communication with the (R)AN-NSSF and the CN-NSSF, is provided to enforce operator policies by verifying the selected (R)AN and CN slice instances before the E2E network slice is formed. The NSCP function contains constraints/attributes associated with network slice instances governing selection and usage of network slice instances. The constraints/attributes may include time-of-day constraints (e.g., peak hours vs. off-peak hours), user type constraints, QoS, etc.

Once verified, the one or more UE slice components, the one or more (R)AN slice components, and the one or more CN slice components form an E2E network slice for supporting the communication service.

Figure 7:
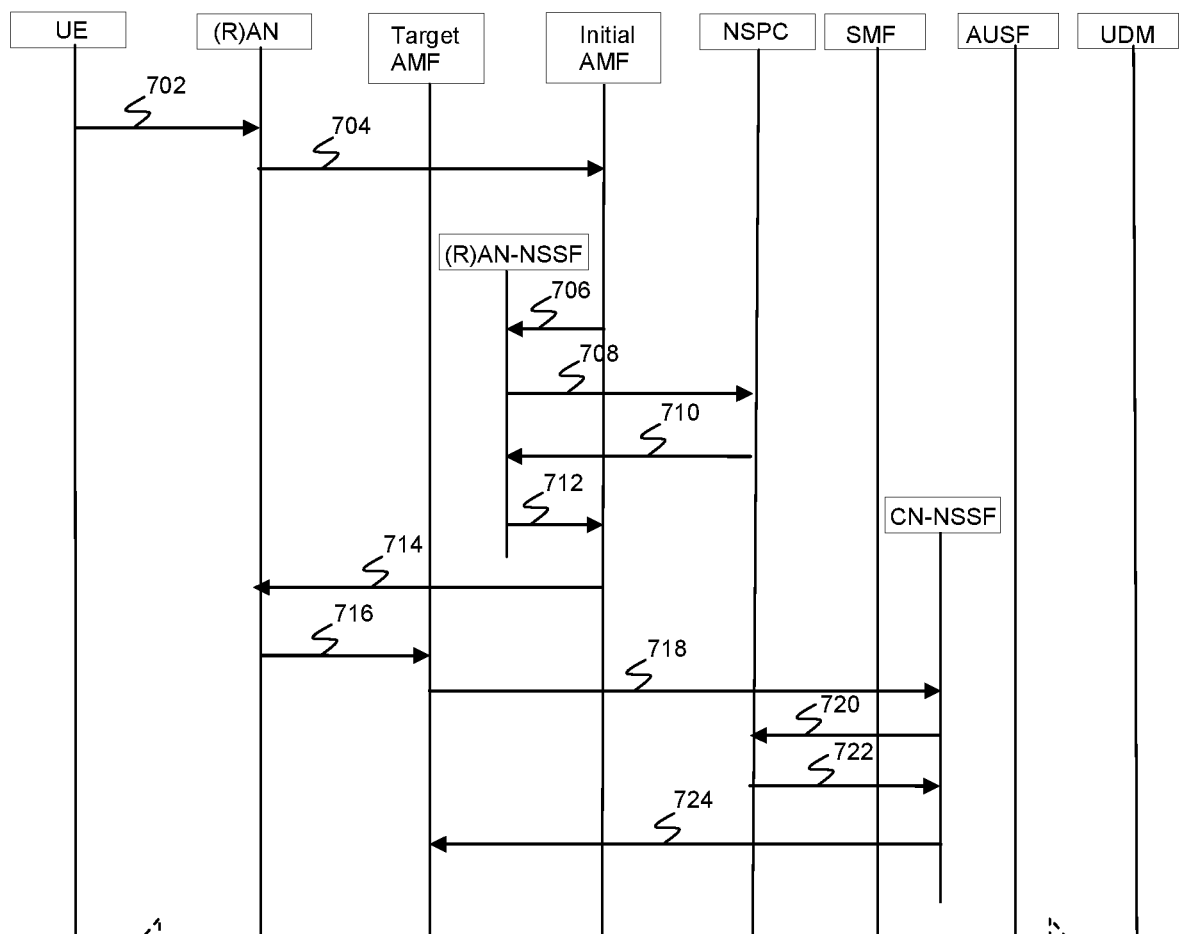
FIG. 7 illustrates a process for network slice selection and configuration according to an embodiment of the present invention.

FIG. 7 illustrates a process for network slice selection and configuration according to an embodiment of the present invention. In an embodiment, the process of FIG. 7 is triggered by a UE wishing to use a communication service over a network. Upon request of the communication service at the UE (e.g., the end user selecting the communication service), a UE slice instance, including one or more UE slice components required for the communication service, is determined. The UE slice instance may be pre-configured within the UE or generated dynamically at the UE. In an embodiment, the UE slice instance is identified by a UE Network Slice ID (UE-NSID) and is associated with a Network Slice Service Type (NSST). The UE slice components are identified by UE Network Slice Component IDs (UE-NSCIDs).

As shown in FIG. 7, the process begins in step 702, which includes the UE sending a Registration Request to a (R)AN. The (R)AN may be the serving (R)AN of the UE. The UE Registration Request may include Requested NSSAI, corresponding to S-NSSAI(s) that the UE wishes to register with for the communication service, and one or more UE-NSCIDs, corresponding to one or more of the UE slice components.

Subsequently, the (R)AN performs AMF selection. Specifically, step 704 includes a first AMF (initial AMF) receiving an AMF selection request from the (R)AN. The AMF selection request includes the Requested NSSAI and the one or more UE-NSCIDs from the UE Registration Request. In an embodiment, subsequent to step 704, the first AMF verifies whether the one or more S-NSSAI(s) in the Requested NSSAI are permitted based on Subscription Information associated with the UE, and authorizes or denies the AMF selection request based on the verification.

Next, the first AMF initiates (R)AN network slice selection. Specifically, step 706 includes sending, from the first AMF to a (R)AN-Network Slice Selection Function ((R)AN-NSSF), a (R)AN slice selection request including the Requested NSSAI and the one or more UE-NSCIDs.

In embodiments, the first AMF may or may not have pre-configured (R)AN slice information available for the Requested NSSAI. Accordingly, in an embodiment, the process may further include, prior to step 706, the first AMF determining whether pre-configured (R)AN slice information is available for the Requested NSSAI. The (R)AN slice information may include at least one of a (R)AN network slice type (AN-NST), a (R)AN slice instance ID (AN-SID), a (R)AN slice component type (AN-SCT), a (R)AN slice component ID (AN-SCID), and a (R)AN slice component Quality of Service (AN-SCQoS), is available for the Requested NSSAI. The first AMF includes the pre-configured (R)AN slice information in the (R)AN slice selection request when available.

Before responding with the information of a selected (R)AN slice instance, the (R)AN-NSSF verifies that the selected (R)AN slice instance complies with operator policies. In an embodiment, this is done by contacting a (NSCP) function. The NSCP function contains constraints/attributes associated with network slice instances, which govern selection and usage of network slice instances. The constraints/attributes may include time-of-day constraints (e.g., peak hours vs. off-peak hours), user type constraints, QoS, etc.

In an embodiment, when the pre-configured (R)AN slice information is included in the (R)AN slice selection request, step 708 includes sending, by the (R)AN-NSSF to the NSCP function, a message to verify the pre-configured (R)AN slice information. In step 710, the NSPC function responds with a verification result of the pre-configured (R)AN slice information. The (R)AN-NSSF determines the selected (R)AN slice information based on the verification result of the pre-configured (R)AN slice information. The verification result may include information to modify the pre-configured (R)AN slice information consistent with operator policies. Alternatively, the verification result may authorize without modification the pre-configured (R)AN slice information.

In another embodiment, when the pre-configured (R)AN slice information is not included in the (R)AN slice selection request, the (R)AN-NSSF generates (R)AN slice information based on the Requested NSSAI and the one or more UE-NSCIDs. Then, step 708 includes sending, by the (R)AN-NSSF to the NSCP function, a message to verify the generated (R)AN slice information. In step 710, the NSPC function responds with a verification result of the generated (R)AN slice information. The (R)AN-NSSF determines the selected (R)AN slice information based on the verification result of the generated (R)AN slice information. The verification result may include information to modify the generated (R)AN slice information consistent with operator policies. Alternatively, the verification result may authorize without modification the generated (R)AN slice information.

The (R)AN-NSSF then returns the selected (R)AN slice information to the first AMF. Accordingly, in step 712, the process includes receiving, by the first AMF from the (R)AN-NSSF, a (R)AN slice selection response. In an embodiment, the (R)AN slice selection response includes an Allowed Single-NSSAI (S-NSSAI) and the selected (R)AN slice information. In an embodiment, the selected (R)AN slice information includes a selected (R)AN network slice instance (NSI) associated with the Allowed S-NSSAI and one or more selected (R)AN slice components associated with the selected (R)AN NSI. In another embodiment, the (R)AN slice selection response further includes information regarding a target AMF that serves the selected (R)AN NSI associated with the Allowed S-NSSAI.

The (R)AN slice selection ends in step 714, which includes the first AMF sending to the (R)AN, a network slice access confirmation including the Allowed S-NSSAI, the selected (R)AN slice information, and/or the information regarding the target AMF. The (R)AN then configures the one or more selected (R)AN slice components for signaling or data traffic forwarding based on their respective functions.

The process of FIG. 7 may terminate at step 714. In another embodiment, the process of FIG. 7 further includes steps 716, 718, 720, 722, and 724, which enables the selection of a CN slice instance for the requested communication service. The selected CN slice instance, together with the initiating UE slice instance and the selected (R)AN slice instance, form an E2E network slice for supporting the communication service.

Figure 1:
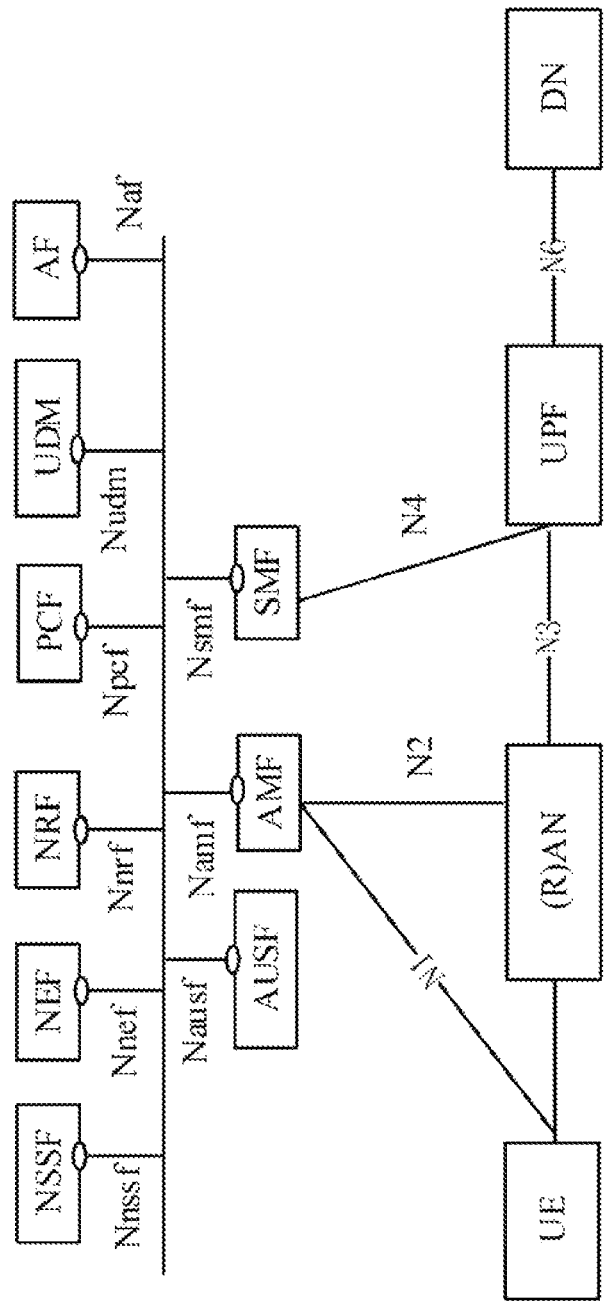
FIG. 1 illustrates the 5G system (5GS) architecture.
Figure 2:
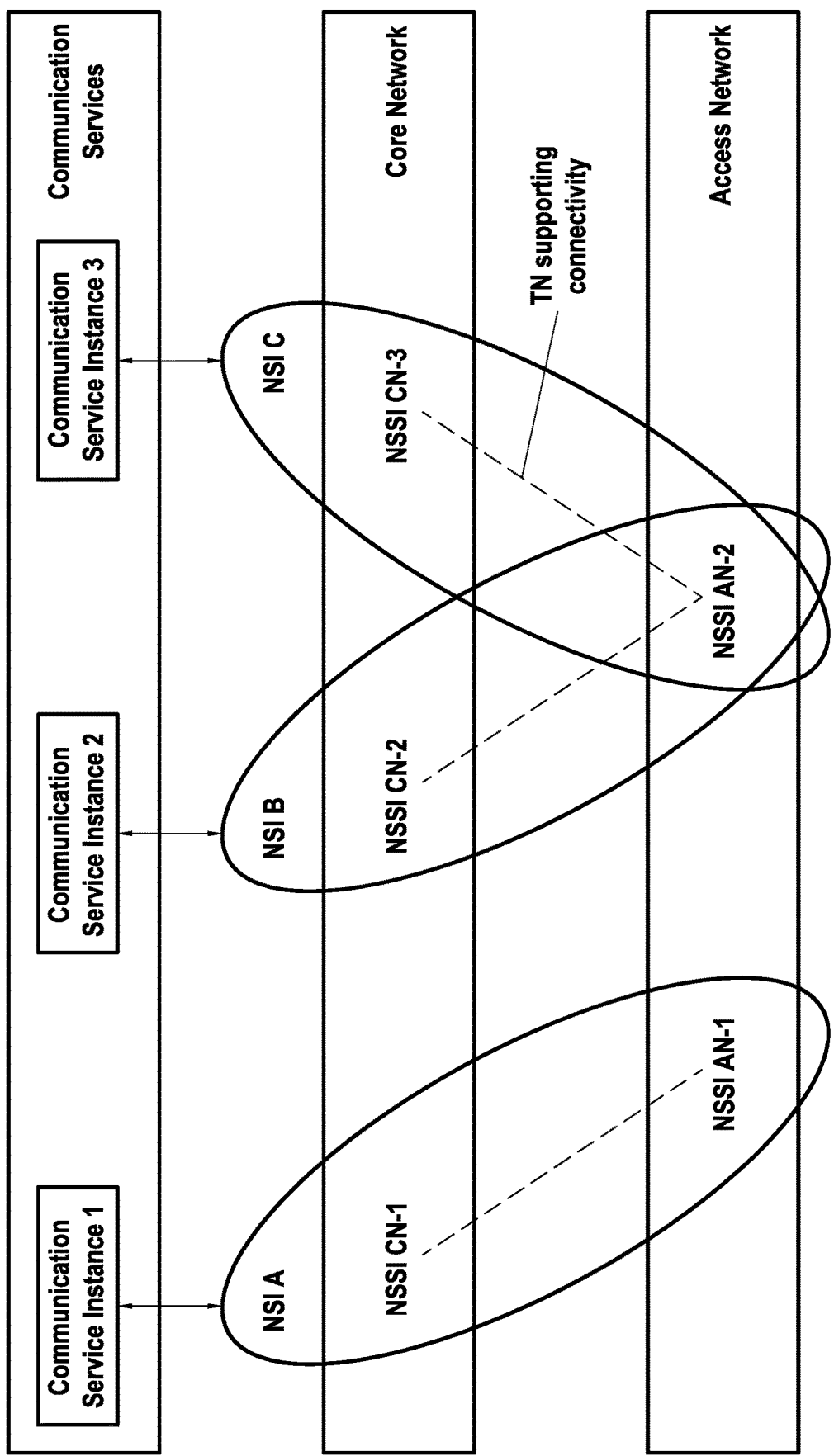
FIG. 2 illustrates the 5G concept of network slicing.
Figure 3:
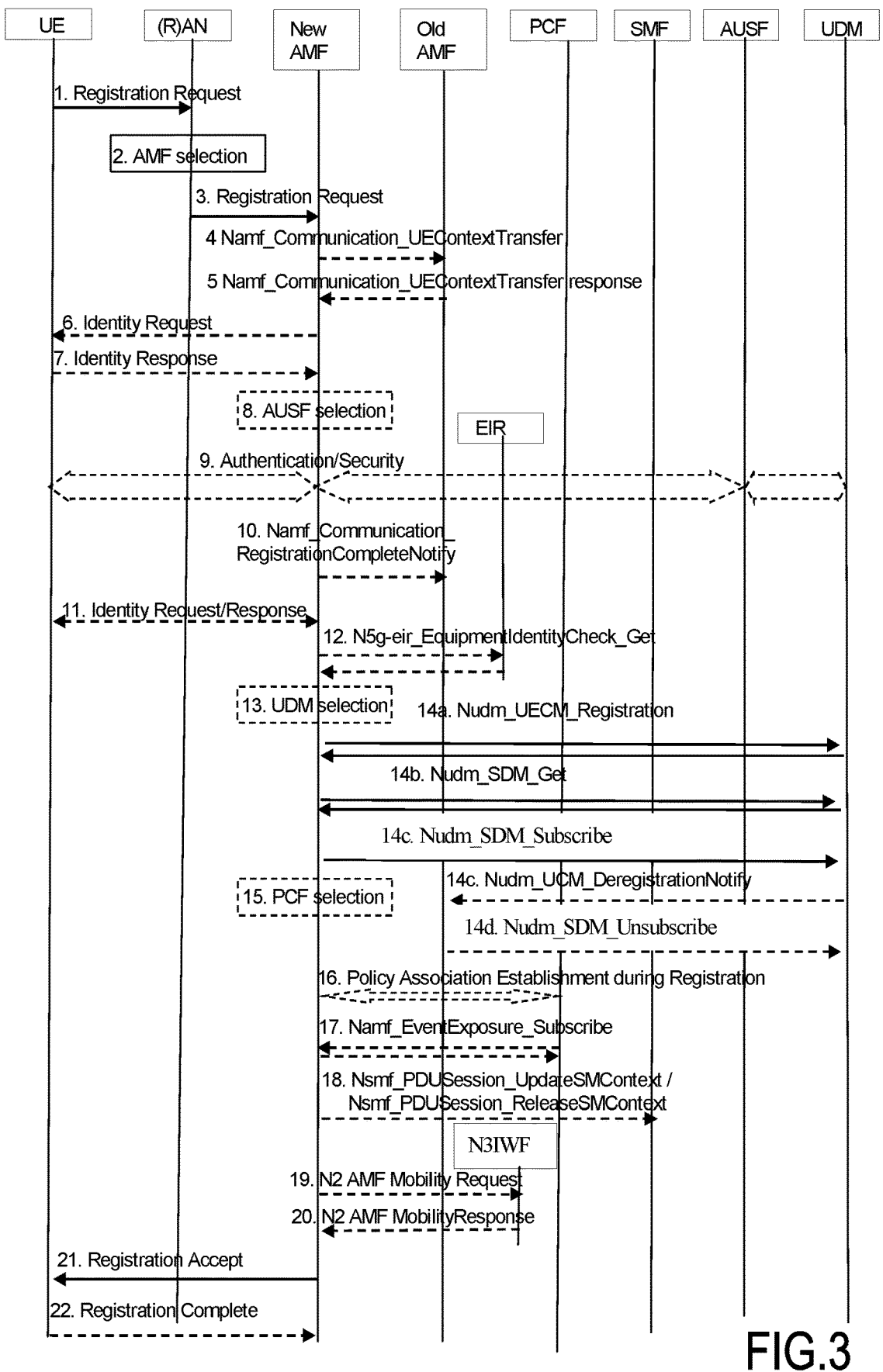
FIG. 3 illustrates a procedure for a User Equipment (UE) to register with a 5GS.

The process may thus continue to step 716, which includes the (R)AN sending the UE Registration Request to the target AMF identified in the (R)AN slice selection response described in step 712 above. In an embodiment, this step may be identical to step 3 of the 5G UE registration procedure, shown in FIG. 3, and described in 3GPP TS 23.502 v15.0.0 (section 4.2.2.2.2).

In another embodiment, the UE Registration Request may include the Requested NSSAI, corresponding to S-NSSAI(s) that the UE wishes to register with for the communication service, and the one or more UE-NSCIDs, corresponding to the one or more of the UE slice components of the UE slice instance.

Upon receiving the UE Registration Request, the target AMF initiates the CN slice instance selection. Specifically, step 718 includes sending, from the target AMF to a Core Network-Network Slice Selection Function (CN-NSSF) a CN slice selection request including the Requested NSSAI and the one or more UE-NSCIDs.

In embodiments, the target AMF may or may not have pre-configured CN slice information available for the Requested NSSAI. Accordingly, in an embodiment, prior to step 718, the process may further include, the target AMF, determining whether pre-configured CN slice information is available for the Requested NSSAI. The CN slice information may include at least one of a CN network slice type (CN-NST), a CN slice instance ID (CN-SID), a CN slice component type (CN-SCT), a CN slice component ID (CN-SCID), and a CN slice component Quality of Service (CN-SCQoS), is available for the Requested NSSAI. The target AMF includes the pre-configured CN slice information in the CN slice selection request when available.

Before responding with the information of a selected CN slice instance, the CN-NSSF verifies that the selected CN slice instance complies with operator policies. In an embodiment, this is done by contacting the NCSP function. The NSCP function contains constraints/attributes associated with network slice instances, which govern selection and usage of network slice instances. The constraints/attributes may include time-of-day constraints (e.g., peak hours vs. off-peak hours), user type constraints, QoS, etc.

In an embodiment, when the pre-configured CN slice information is included in the CN slice selection request, step 720 includes sending, by the CN-NSSF to the NSCP function, a message to verify the pre-configured CN slice information. In step 722, the NSPC function responds with a verification result of the pre-configured CN slice information. The CN-NSSF determines the selected CN slice information based on the verification result of the pre-configured CN slice information. The verification result may include information to modify the pre-configured CN slice information consistent with operator policies. Alternatively, the verification result may authorize without modification the pre-configured CN slice information.

In another embodiment, when the pre-configured CN slice information is not included in the CN slice selection request, the CN-NSSF generates CN slice information based on the Requested NSSAI and the one or more UE-NSCIDs. Then, step 720 includes sending, by the CN-NSSF to the NSCP function, a message to verify the generated CN slice information. In step 722, the NSPC function responds with a verification result of the generated CN slice information. The CN-NSSF determines the selected CN slice information based on the verification result of the generated CN slice information. The verification result may include information to modify the generated CN slice information consistent with operator policies. Alternatively, the verification result may authorize without modification the generated CN slice information.

The CN-NSSF then returns the selected CN slice information to the target AMF. Accordingly, in step 724, the process includes receiving, by the target AMF from the CN-NSSF, a CN slice selection response. In an embodiment, the CN slice selection response includes an Allowed S-NSSAI and the selected CN slice information. In an embodiment, the selected CN slice information includes a selected CN network slice instance (NSI) associated with the Allowed S-NSSAI and one or more selected CN slice components associated with the selected CN NSI. The target AMF configures the one or more selected CN slice components for signaling or data traffic forwarding based on their respective functions.

Subsequently, the process continues with steps 4-22 of the UE registration procedure described in 3GPP TS 23.502 v15.0.0 (section 4.2.2.2). These steps will not be described herein.

Figure 8:
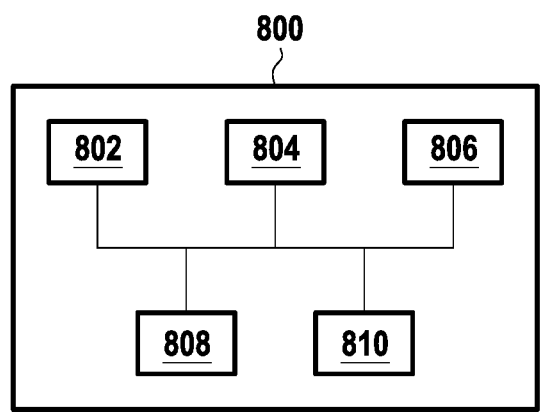
FIG. 8 illustrates a computer device which may be used to implement embodiments of the present invention.

FIG. 8 illustrates a computer device 800 which may be used to implement embodiments of the present invention. Specifically, the above-described described (R)AN, first AMF, target AMF, (R)AN-NSSF, CN-NSSF, and NSPC functions/modules may each be implemented using a computer device such as computer device 800.

As shown in FIG. 8, computer device 800 includes a processor 802, a read-only memory (ROM) 804, a random access memory (RAM) 806, a non-volatile memory 808, and communication means 810 (i.e., a sender and a receiver) suitable for supporting the communication functions of the implementing module (e.g., (R)AN, first AMF, target AMF, (R)AN-NSSF, CN-NSSF, and NSPC).

The ROM 804 of the computer device 800 may store a computer program including instructions that when executed by processor 802 cause processor 802 to perform a method of the present invention. The method may include one or more of the steps described above in FIG. 7 depending on the implementing module (e.g., (e.g., (R)AN, first AMF, target AMF, (R)AN-NSSF, CN-NSSF, and NSPC). For example, when the implementing module is the first AMF, the instructions, when executed by the processor, may cause the processor to receive using the receiver, from a (R)AN, an AMF selection request including NSSAI and a UE-NSCID; send using the sender, to a (R)AN-NSSF, a (R)AN slice selection request including the Requested NSSAI and the UE-NSCID; receive using the receiver, from the (R)AN-NSSF, a (R)AN slice selection response including an Allowed S-NSSAI and selected (R)AN slice information including a selected (R)AN NSI associated with the Allowed S-NSSAI and a selected (R)AN slice component associated with the selected (R)AN NSI; and send using the sender, to the (R)AN, a network slice access confirmation including the Allowed S-NSSAI and the selected (R)AN slice information. In an embodiment, the instructions may further cause the processor to verify whether an S-NSSAI in the Requested NSSAI is permitted based on Subscription Information; and to authorize or deny the AMF selection request based on the verification. In another embodiment, the instructions may further cause the processor, before sending the (R)ANs slice selection request, to determine whether pre-configured (R)AN slice information, including at least one of a (R)AN network slice type (AN-NST), a (R)AN slice instance ID (AN-SID), a (R)AN slice component type (AN-SCT), a (R)AN slice component ID (AN- SCID), and a (R)AN slice component Quality of Service (AN-SCQoS), is available for the Requested NSSAI; and include the pre-configured (R)AN slice information in the (R)AN slice selection request when available.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method, performed by a network, for network slice selection and configuration, the method comprising:
   receiving, by a first Access and Mobility Management Function (AMF) from a (Radio) Access Network ((R)AN), an AMF selection request, the AMF selection request including:
      Requested Network Slice Selection Assistance Information (NSSAI), and
      a User Equipment (UE) Network Slice Component Identifier (UE-NSCID) the UE-NCSID identifying a UE slice component of a UE slice instance determined at a UE;
   sending, from the first AMF to a (R)AN-Network Slice Selection Function ((R)AN-NSSF), a (R)AN slice selection request, the (R)AN slice selection request including:
      the Requested NSSAI, and
      the UE-NSCID;
   receiving, by the first AMF from the (R)AN-NSSF, a (R)AN slice selection response, the (R)AN slice selection response including:
      an Allowed Single-NSSAI (S-NSSAI), and
      selected (R)AN slice information, the selected (R)AN slice information including:
         a selected (R)AN network slice instance (NSI) associated with the Allowed S-NSSAI, and
         a selected (R)AN slice component associated with the selected (R)AN NSI; and
   sending, from the first AMF to the (R)AN, a network slice access confirmation, the network slice confirmation including:
      the Allowed S-NSSAI, and
      the selected (R)AN slice information.

2. The method of claim 1, further comprising:
   verifying whether an S-NSSAI in the Requested NSSAI is permitted based on Subscription Information; and
   authorizing or denying the AMF selection request based on the verification.

3. The method of claim 1, further comprising:
   determining whether pre-configured (R)AN slice information is available for the requested NSSAI, wherein the pre-configured (R)AN slice information includes at least one of:
      a (R)AN network slice type (AN-NST),
      a (R)AN slice instance ID (AN-SID),
      a (R)AN slice component type (AN-SCT),
      a (R)AN slice component ID (AN-SCID), and
      a (R)AN slice component Quality of Service (AN-SCQoS); and
   including the pre-configured (R)AN slice information in the (R)AN slice selection request when available.

4. The method of claim 3, further comprising, when the pre-configured (R)AN slice information is included in the (R)AN slice selection request:
   sending, by the (R)AN-NSSF to a Network Slice Policy Control (NSCP) function, a message to verify the pre-configured (R)AN slice information; and
   determining, by the (R)AN-NSSF, the selected (R)AN slice information based on a verification result of the pre-configured (R)AN slice information.

5. The method of claim 4, wherein the (R)AN slice selection response further includes information regarding a target AMF that serves the selected (R)AN NSI associated with the Allowed S-NSSAI.

6. The method of claim 5, further comprising:
   sending, from the target AMF to a Core Network-Network Slice Selection Function (CN-NSSF) a CN slice selection request, the CN slice selection request including:
      the Requested NSSAI, and
      the UE-NSCID; and
   receiving, by the target AMF from the CN-NSSF, a CN slice selection response, the CN selection response including:
      information regarding the Allowed S-NSSAI, and
      selected CN slice information, the selected CN slice information including:
         a selected CN NSI associated with the Allowed S-NSSAI, and
         a selected CN slice component associated with the selected CN NSI.

7. The method of claim 6, further comprising
   determining whether pre-configured CN slice information is available for the Requested NSSAI, wherein the pre-configured CN slice information includes at least one of:
      a CN network slice type (CN-NST),
      a CN slice instance ID (CN-SID),
      a CN slice component type (CN-SCT),
      a CN slice component ID (CN-SCID), and
      a CN slice component Quality of Service (CN-SCQoS); and
   including the pre-configured CN slice information in the CN slice selection request when available.

8. The method of claim 7, further comprising, when the pre-configured CN slice information is included in the CN slice selection request:
   sending, by the CN-NSSF to the NSCP function, a message to verify the pre-configured CN slice information; and
   determining the selected CN slice information based on a verification result of the pre-configured CN slice information.

9. The method of claim 7, further comprising, when the pre-configured CN slice information is not included in the CN slice selection request:
   generating, by the CN-NSSF, CN slice information based on the Requested NSSAI and the UE-NSCID;
   sending, by the CN-NSSF to NSCP function, a message to verify the generated CN slice information; and
   determining, by the CN-NSSF, the selected CN slice information based on a verification result of the generated CN slice information.

10. The method of claim 3, further comprising, when the pre-configured (R)AN slice information is not included in the (R)AN slice selection request:
    generating, by the (R)AN-NSSF, (R)AN slice information based on the Requested NSSAI and the UE-NSCID;
    sending, by the (R)AN-NSSF to a Network Slice Policy Control (NSCP) function, a message to verify the generated (R)AN slice information; and determining, by the (R)AN-NSSF, the selected (R)AN slice information based on a verification result of the generated (R)AN slice information.

11. The method of claim 1, further comprising:
configuring, by the (R)AN, the selected (R)AN slice component for signaling or data traffic forwarding.

12. The method of claim 11, wherein the (R)AN slice selection response further includes information regarding a target AMF that serves the selected (R)AN NSI associated with the Allowed S-NSSAI.

13. A network function module, comprising
a transmitter;
a receiver;
a processor; and
a memory, coupled to the processor, having instructions stored therein that, when executed by the processor, cause the processor to:
  receive using the receiver, from a (Radio) Access Network ((R)AN), an AMF selection request, the AMF selection request including:
    Requested Network Slice Selection Assistance Information (NSSAI), and
    a User Equipment (UE) Network Slice Component Identifier (UE-NSCID), the UE-NCSID identifying a UE slice component of a UE slice instance determined at a UE;
  send using the transmitter, to a (R)AN-Network Slice Selection Function ((R)AN-NSSF), a (R)AN slice selection request, the (R)AN slice selection request including:
    the Requested NSSAI, and
    the UE-NSCID;
  receive using the receiver, from the (R)AN-NSSF, a (R)AN slice selection response, the (R)AN slice selection response including:
    an Allowed Single-NSSAI (S-NSSAI), and
    selected (R)AN slice information, the selected (R)AN slice information including:
      a selected (R)AN network slice instance (NSI) associated with the Allowed S-NSSAI, and
      a selected (R)AN slice component associated with the selected (R)AN NSI; and
  send using the transmitter, to the (R)AN, a network slice access confirmation, the network slice access confirmation including:
    the Allowed S-NSSAI, and
    the selected (R)AN slice information.

14. A network, comprising:
a (Radio) Access Network-Network Slice Selection Function ((R)AN-NSSF) configured to:
  receive a (R)AN slice selection request, including a User Equipment (UE) Network Slice Component Identifier (UE-NSCID) identifying a UE slice component, and
  select from a pool of (R)AN slice instances, based on the UE-NSCID, a (R)AN network slice instance including one or more (R)AN slice components; and
a Core Network-Network Slice Selection Function (CN-NSSF) configured to:
  receive a CN slice selection request including the UE-NSCID, and
  select from a pool of CN slice instances, based on the UE-NSCID, a CN network slice instance including one or more CN slice components,
wherein the (R)AN slice instance and the CN slice instance are configured based on at least one of a service type, a service level agreement (SLA), or a Quality of Service (QoS) associated with a communication service using the UE slice component.

15. The network of claim 14, further comprising:
a Network Slice Policy Control (NSPC) function, in communication with the (R)AN-NSSF and the CN-NSSF, configured to verify that the selected (R)AN slice instance and CN slice instance are consistent with operator policies.

16. The network of claim 14, wherein the UE slice component, the one or more (R)AN slice components, and the one or more CN slice components form an end-to-end (E2E) network slice for supporting the communication service.

* * * * *